US012754005B2

(12) United States Patent
Roithmeier et al.

(10) Patent No.: US 12,754,005 B2
(45) Date of Patent: Oct. 6, 2026

(54) GENERATION OF MEASUREMENT STRATEGY FOR MEASURING A MEASUREMENT OBJECT

(71) Applicant: Carl Zeiss Industrielle Messtechnik GmbH, Oberkochen (DE)

(72) Inventors: Robert Roithmeier, Seehausen Am Staffelsee (DE); Günter Haas, Aalen (DE); Markus Esser, Königsbronn (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 230 days.

(21) Appl. No.: 17/236,624

(22) Filed: Apr. 21, 2021

(65) Prior Publication Data

US 2021/0348907 A1 Nov. 11, 2021

(30) Foreign Application Priority Data

Apr. 21, 2020 (EP) .................................... 20170619

(51) Int. Cl.
*G01B 5/008* (2006.01)
*B25J 9/16* (2006.01)
(Continued)

(52) U.S. Cl.
CPC ............. *G01B 5/008* (2013.01); *B25J 9/1692* (2013.01); *G01B 11/005* (2013.01); *G01B 21/04* (2013.01);
(Continued)

(58) Field of Classification Search
None
See application file for complete search history.

(56) References Cited

U.S. PATENT DOCUMENTS 6,400,998 B1 * 6/2002 Yamazaki ............ G05B 19/401 700/86
9,683,828 B2 * 6/2017 Pettersson ............ G05B 19/401
(Continued)

FOREIGN PATENT DOCUMENTS

CN 107548449 A 1/2018
EP 158269 A2 11/2001
(Continued)

OTHER PUBLICATIONS

Machine Translation for FR2930819A1 (Year: 2009).*
(Continued)

*Primary Examiner* — Arleen M Vazquez
*Assistant Examiner* — Leonard S Liang
(74) *Attorney, Agent, or Firm* — Miller Johnson

(57) ABSTRACT

A method for determining an altered measurement strategy for measurement of a measurement object using a coordinate measuring machine includes measuring the measurement object according to an initial measurement strategy. The method includes determining a measurement quality of the measurement. The method includes, in response to the measurement quality being greater than a predetermined target minimum measurement quality, altering the initial measurement strategy to produce the altered measurement strategy. The altering is performed such that at least one of time required to measure the measurement object in accordance with the altered measurement strategy is reduced, computational outlay required to measure the measurement object in accordance with the altered measurement strategy is reduced, and data storage capacity required to measure the measurement object in accordance with the altered measurement strategy is reduced.

29 Claims, 2 Drawing Sheets

(51) Int. Cl.

| | |
|---|---|
| *G01B 11/00* | (2006.01) |
| *G01B 21/04* | (2006.01) |
| *G05B 13/04* | (2006.01) |
| *G05B 19/401* | (2006.01) |
| *G05B 19/418* | (2006.01) |

(52) U.S. Cl.

CPC .......... *G01B 21/042* (2013.01); *G01B 21/045* (2013.01); *G01B 21/047* (2013.01); *G05B 13/042* (2013.01); *G05B 19/401* (2013.01); *G05B 19/41875* (2013.01)

(56) References Cited

U.S. PATENT DOCUMENTS

| | | | | |
|---|---|---|---|---|
| 10,655,960 | B2 * | 5/2020 | Li | G01B 21/04 |
| 10,767,988 | B2 | 9/2020 | Georgi et al. | |
| 11,162,787 | B2 * | 11/2021 | Pan | G01B 21/04 |
| 2002/0029119 | A1 | 3/2002 | Lotze et al. | |
| 2002/0032541 | A1 * | 3/2002 | Raab | G05B 19/4202<br>702/152 |
| 2008/0189969 | A1 * | 8/2008 | Fuchs | G01B 21/045<br>33/503 |
| 2008/0250625 | A1 * | 10/2008 | Slettemoen | G01B 21/045<br>29/407.04 |
| 2011/0264402 | A1 * | 10/2011 | Anderson | G05B 19/4015<br>702/150 |
| 2012/0072156 | A1 * | 3/2012 | Fukuda | G01B 5/0016<br>702/95 |
| 2013/0030773 | A1 * | 1/2013 | O'Hare | G01B 21/04<br>703/1 |
| 2014/0222373 | A1 * | 8/2014 | Sprenger | G01B 5/008<br>702/155 |
| 2015/0266183 | A1 * | 9/2015 | Alifragkis | B25J 9/1692<br>700/254 |
| 2017/0138726 | A1 * | 5/2017 | Roithmeier | G01B 21/042 |
| 2017/0160066 | A1 * | 6/2017 | Grupp | G01B 21/04 |
| 2018/0045511 | A1 * | 2/2018 | Georgi | G01B 21/04 |
| 2018/0328705 | A1 * | 11/2018 | Sprenger | G01D 5/34746 |
| 2019/0003813 | A1 * | 1/2019 | Ruck | G01B 5/012 |
| 2019/0271529 | A1 * | 9/2019 | Gruenewald | G05B 19/401 |
| 2021/0140753 | A1 * | 5/2021 | Eckardt | G01B 11/005 |
| 2021/0232989 | A1 * | 7/2021 | Rana | B25J 9/1694 |
| 2021/0281741 | A1 * | 9/2021 | Rieger | G01B 11/005 |
| 2021/0325164 | A1 * | 10/2021 | Haas | G01B 7/012 |
| 2021/0333775 | A1 * | 10/2021 | Häring | G01B 11/005 |

FOREIGN PATENT DOCUMENTS

| | | | | |
|---|---|---|---|---|
| EP | 1158269 | B1 | 11/2001 | |
| EP | 1902275 | B1 | 12/2008 | |
| EP | 2738515 | A1 * | 6/2014 | G01B 11/005 |
| EP | 3286524 | B1 | 7/2019 | |
| EP | 3403051 | B1 | 10/2019 | |
| FR | 2930819 | A1 * | 11/2009 | G01B 21/042 |
| WO | WO-2009141333 | A1 * | 11/2009 | G01B 21/045 |

OTHER PUBLICATIONS

Machine Translation for WO2009141333A1 (Year: 2009).*

ISO/IEC, Guide to the Expression of Uncertainty in Measurement; 2010; pp. 3-98.

VDA, Quality Management in the Automotive Industry vol. 5, Capability of Measurement Processes; 2nd completely revised edition; Jul. 2011; pp. 26-44.

Mitutoyo, MiCAT Planner, Efficient Part Program Generation, https://mitutoyo.de/application/files/2715/8918/3421/PR1446_MiCAT_Planner_WEB.pdf, pp. 11-12.

Extended European Search Report for EP App. No. 20170619.9, Sep. 15, 2020.

* cited by examiner

GENERATION OF MEASUREMENT STRATEGY FOR MEASURING A MEASUREMENT OBJECT

CROSS-REFERENCE TO RELATED APPLICATIONS

This application claims priority to EP 20 170 619.9 filed Apr. 21, 2020, the entire disclosure of which is incorporated by reference.

FIELD

The present disclosure relates industrial metrology and more particularly to determining a measurement strategy for measuring a measurement object using a coordinate measuring machine.

BACKGROUND

The prior art has disclosed methods for specifying default data for measuring a workpiece to be measured using a coordinate measuring machine. For example, EP 3 403 051 B1 describes such a method, wherein a test feature to be determined, which should be measured during the measurement of the workpiece and determined during the evaluation of the measurement results, is defined in respect of the following test feature properties: a) dimensions of the test feature, b) type of tolerance and c) admissible tolerance range. Further, the data assigned to an existing similar test feature are retrieved from a set of existing test features and are defined as default data if a similarity criterion is satisfied.

It is also known that the measurement parameters used during the measurement of a measurement object, such as, e.g., probing parameters of a sensor of the coordinate measuring machine or a maximum speed of a relative movement between measurement object and sensor, have effects on the measurement quality. As a rule, the resultant measurement quality deteriorates as this relative speed increases. It also regularly holds true that, as a rule, the measurement quality increases with number of measurement points captured during the measurement.

However, a high measurement quality, for example by capturing a large number of measurement points and/or by setting a relatively slow speed of the relative movement, can also have effects on the measurement time, i.e., the time required for the measurement. As a rule, this measurement time increases as more measurement points are captured or as the relative speed decreases.

Therefore, the rule applying as a matter of principle is that obtaining a high measurement quality tends to need a longer measurement time than obtaining a comparatively lower measurement quality.

Additionally, computational outlay and required storage space increase with increasing number of measurement points generated.

A long measurement time, a great computational outlay required for measuring the measurement object and/or a large amount of data storage capacity required for measuring the measurement object are disadvantageous since, as a rule, this lengthens a process time of a process in which the measurement is included and since the components such as data processing devices and storage devices required for the measurement are expensive.

SUMMARY

Hence, the technical problem arising is that of developing a method and an apparatus for determining a measurement strategy for measuring a measurement object using a coordinate measuring machine and of developing a program, which do not have the aforementioned disadvantages, i.e., in particular, which facilitate a fast measurement in terms of time and/or a measurement with reduced computational outlay and/or reduced required data storage capacity.

The solution to the technical problem is provided by the subjects with the features of the independent claims. Further advantageous configurations of the invention are evident from the dependent claims.

A method for determining a measurement strategy for measuring a measurement object using a coordinate measuring machine is proposed. Such a coordinate measuring machine may comprise a sensor that produces measurement points which represent the relative spatial position of a surface point of the measurement object. By way of example, such a sensor can be a tactile sensor or an optical sensor.

Coordinate measuring machines are known to a person skilled in the art, wherein a coordinate measuring machine can be embodied, in particular, as a column-type coordinate measuring machine or a bridge-type coordinate measuring machine. However, other embodiments of the coordinate measuring machine are naturally also conceivable.

In this case, the measurement strategy defines how the measurement object is measured. In particular, defining the measurement strategy comprises one or more of the following aspects:

defining a test plan, which will still be explained in more detail below, defining a sensor to be used for the measurement, defining a filter used for processing the measurement points, defining an evaluation strategy including a method for outlier elimination, defining a measurement process, defining a clamping/fixation concept, defining an alignment strategy for defining the alignment between sensor and measurement object, defining an illumination concept, defining a zoom of an optical sensor, defining the number of measurement points to be captured, defining the spatial distribution of the measurement points, defining the probing force, defining the relative speed between measurement object and sensor (scanning speed), defining the use of a rotary table and defining further parameters of the measurement.

In the method proposed, the measurement object is measured in accordance with a measurement strategy, in particular a predetermined measurement strategy. The latter can be defined by a user, for example. It is also conceivable to use a (partly) automated method, in particular a computer-implemented method, to define the measurement strategy. Methods for defining a measurement strategy by a user or methods for (partly) automated definition are known to a person skilled in the art.

Further, a measurement quality of the measurement of the measurement object is determined in accordance with this measurement strategy. In this case, the measurement comprises both the generation of measurement values and the evaluation thereof. Methods for determining the measurement quality are likewise known to a person skilled in the art. By way of example, such methods can serve to determine the accuracy, the repeatability, the reproducibility, the linearity or the stability of the measurement, with the measurement quality being determined as one of the aforementioned parameters or as a variable depending on one or more of these parameters.

According to the invention, the measurement strategy is altered if the measurement quality is greater than a predetermined target minimum measurement quality, in particular greater than the target minimum measurement quality by more than a predetermined amount. Expressed differently, the measurement strategy is altered if the measurement quality exceeds minimum requirements, i.e., is greater than a required amount.

In this case, the measurement strategy is altered in such a way that the time required to measure the measurement object in accordance with the (altered) measurement strategy is reduced in comparison with the non-altered, i.e., original, measurement strategy.

Alternatively or cumulatively, the measurement strategy can be altered in such a way that the required computational outlay and/or the required data storage capacity to measure the measurement object in accordance with the (altered) measurement strategy is reduced in comparison with the non-altered, i.e., original, measurement strategy.

To this end, to alter the measurement strategy, it is possible, in particular, to alter a measurement quality-relevant parameter of the measurement strategy, as will be explained in more detail below.

Expressed differently, the measurement strategy is therefore adapted in such a way that a shorter measurement time and/or a lower computational outlay and/or a smaller data storage capacity is needed to carry out the measurement if the measurement quality is greater than what is required.

In this case, the change can be carried out in such a way that a maximum reduction in the required time for the measurement and/or in the required computational outlay for the measurement and/or in the required data storage capacity for the measurement is achieved. To this end, it is possible to estimate the corresponding effect of the change on the time, the computational outlay and/or the data storage capacity, for example on the basis of a relationship, known in advance, between the change and the effect.

In this case, the change can also be carried out in such a way that a maximum reduction in the time required for the measurement and/or in the required computational outlay for the measurement and/or in the required storage capacity for the measurement is achieved while ensuring the target minimum measurement quality at the same time. To this end, it is also possible to estimate the corresponding effect of the change on the measurement quality, for example on the basis of a relationship, known in advance, between the change and the effect.

It is also possible for the method to be carried out repeatedly, in particular until the measurement quality equals the predetermined target minimum measurement quality or is no longer greater than the latter by more than a predetermined amount.

Here, the method can alter the measurement strategy at the runtime of the measurement. In particular, the proposed method allows the measurement strategy to be altered dynamically during the measurement, in particular during a measurement procedure or following a measurement procedure. Advantageously, this allows the measurement method, which is defined by the measurement strategy, to be adapted to the measurement object and its production quality. Furthermore, adapting to the coordinate measuring machine and the sensor system employed is also facilitated.

The altered measurement strategy or parameters which define the altered measurement strategy can be stored and can be subsequently retrieved and used for a subsequent measurement of the same or similar measurement objects. It is also possible to assign the specified parameters to a CAD model of the measurement object to be measured and store said specified parameters with the corresponding assignment information items, for example in the form of so-called PMI (production manufacturing information) information items.

Overall, a faster measurement of the measurement object in terms of time can be achieved using the proposed method, as a result of which the process duration of a process, in which the measurement is incorporated, for example a quality test, is reduced. If the measurement requires less computational outlay, it is advantageously possible to utilize less powerful elements, in particular computing devices, which are used to generate and/or evaluate the measurement points. Since, as a rule, these are cheaper and also require less installation space, it is consequently possible to achieve a reduction in production costs and, possibly, a reduction in the installation space required by the coordinate measuring machine. Additionally, the reduction in the computational outlay advantageously contributes to a faster measurement in terms of time, i.e., a shorter measurement time. Similar statements apply to the reduction in the data storage capacity, by means of which similar advantages can be obtained to those in the reduction of the computational outlay.

In a further embodiment, the measurement strategy is altered in such a way that the measurement quality is reduced. This advantageously yields a particularly significant reduction in the measurement time and/or in the required computational outlay, as explained above, and/or in the required data storage capacity, as explained above, since the reduction in the measurement quality allows at least one measurement parameter, e.g., the speed of the relative movement during the measurement, to be altered in such a way that the aforementioned significant reduction is facilitated.

In a further embodiment, the measurement quality is determined by virtue of determining at least one measurement quality parameter that represents the measurement quality. This advantageously yields a technical implementation of the proposed method that is as simple as possible since a simple parameter evaluation can be performed in order to determine whether the measurement quality is greater than a predetermined target minimum quality. Such an evaluation can be carried out, in particular, by a data processing device which can comprise, or can be embodied as, a computing device, wherein the computing device can be embodied as, or comprise, a micro-controller or an integrated circuit, for example.

In a further embodiment, the measurement quality parameter is a relationship between the measurement uncertainty and a manufacturing tolerance known in advance. Here, a measurement uncertainty and the manufacturing tolerance known in advance denote value ranges. Methods for (quantitatively) determining the measurement uncertainty are known to a person skilled in the art.

By way of example, the predetermined target minimum quality can lie in a range of $\frac{1}{20}$ (inclusive) to $\frac{1}{5}$ (inclusive), with, e.g., a target minimum measurement quality of $\frac{1}{10}$ meaning that the size of the value range of the measurement uncertainty should not exceed $\frac{1}{10}$ of the size of the value range of the tolerance, the size of a value range being determined as difference between the maximum and the minimum value of the value range.

If the measurement quality is represented by such a parameter, a greater measurement quality arises with decreasing quantitative value of the parameter. Conversely, the measurement quality is lower with a greater quantitative value.

Since there are known methods for determining the measurement uncertainty, e.g., a process according to ISO/IEC Guide 98-3:2008.9, Edition 2008, a simple implementation of the proposed method advantageously arises for different coordinate measuring machines and different measurement objects.

In a further embodiment, a variable that represents the accuracy, repeatability, reproducibility, linearity and/or stability of the measurement in accordance with the measurement strategy is determined as measurement quality, in particular as measurement quality parameter.

Here, the accuracy can describe the extent of the approach of a measurement value to a true value of a measurement variable. Corresponding methods for determining the accuracy are known to a person skilled in the art. By way of example, accuracy can be determined by a repeated measurement of the same measurement object and then as deviation of the mean value of the results of the measurement processes from a reference value. However, other methods, known to a person skilled in the art, for determining the accuracy can naturally also be used.

The repeatability can be ascertained by virtue of the same measurement object being measured multiple times. The repeatability can be determined as a standard deviation of the generated measurement values. However, other methods, known to a person skilled in the art, for determining the repeatability can naturally also be used.

By way of example, the reproducibility can be determined as the difference between the mean values of different measurement processes with a plurality of measurements in each case, which are carried out by different operators, at different locations and/or with different devices of the same type. However, other methods, known to a person skilled in the art, for determining the reproducibility can naturally also be used.

By way of example, the stability can be determined by virtue of the measurement object being measured in a plurality of measurement processes with fixed time intervals therebetween, with each measurement process comprising a plurality of measurements and the mean value of the measurement values of the different measurements being determined. Then, the linearity can be determined from the difference between the mean values determined at different times. However, other methods, known to a person skilled in the art, for determining the stability can naturally also be used.

The linearity can be determined for example by measuring a plurality of measurement objects, with the feature values of these measurement objects covering a desired value range. Each measurement object can be measured repeatedly in the process. Then, the mean value of the corresponding measurement values is calculated for each measurement object and the difference between a target value and the mean value is calculated for each measurement object. Further, a variable representing the equality of these differences for all measurement objects is determined. By way of example, if the differences have different sizes, a non-linearity of the measurement can be assumed. Other methods, known to a person skilled in the art, for determining the linearity are naturally also able to be used.

Overall, a reliable and easy to implement determination of the measurement quality advantageously arises by determining the aforementioned variables or variables dependent thereon.

In a further embodiment, a GR&R test (Gauge R&R test) is used to determine the variable representing the measurement quality. Such a test can also be referred to as a type 2 test. In this case, corresponding methods are known to the person skilled in the art. Alternatively, it is also possible to use a test pursuant to VDA Volume 5, 2nd completely reworked edition, updated 2011, to determine the variable representing the measurement quality, with the VDA Volume 5 document describing suitable methods for determining such a variable.

Advantageously, this also results in an improvement of the implementability of the proposed method since it is possible to apply simple and, in particular, established test methods for determining the measurement quality.

In a preferred embodiment, at least one measurement quality-relevant parameter of the measurement strategy is altered when the measurement quality is greater than a target minimum measurement quality known in advance. The parameter being measurement quality-relevant can mean that a change in the parameter also brings about a change in the measurement quality. A parameter can also be measurement quality-relevant if a change in this parameter by more than a predetermined amount brings about a change in the measurement quality by more than a predetermined amount. In particular, the measurement quality-relevant parameter of the measurement strategy can be altered in such a way that the measurement quality is reduced. Exemplary measurement quality-relevant parameters are explained in even greater detail below. Altering a parameter advantageously results in a reliable and, in terms of time, quick change of the measurement strategy within the desired meaning since only one or more parameters of an existing measurement strategy is/are altered. In particular, it is not necessary to alter, e.g., an evaluation method which is part of the measurement strategy.

In a further embodiment, the at least one parameter of the measurement strategy is or represents at least one sensor parameter of a sensor of the coordinate measuring machine. Such a sensor parameter can represent an adjustable property of the sensor. By way of example, the sensor parameter is a probing parameter of a sensor of the coordinate measuring machine. In particular, a probing parameter can be a probing force and/or a probing orientation. Within the meaning of this invention, probing a measurement object by a sensor denotes both tactile probing by contact and optical probing by an optical sensor. A sensor parameter can also be or represent a focus value of an optical sensor of the coordinate measuring machine. By way of example, a sensor parameter can also be a probe ball diameter of a utilized probe. A further sensor parameter can be a maximum admissible penetration depth, e.g., into a bore.

Preferably, a parameter of the measurement strategy is or represents a number of measurement points to be captured by the sensor within a predetermined time interval. By way of example, this number per time interval can also be referred to as capture rate or scanning rate.

Further preferably, the at least one parameter can be or represent a parameter of the spatial distribution of the measurement points to be captured. In particular, this parameter can represent whether a high- or low-density spatial distribution is present.

Further, the at least one parameter can be or represent a (maximum) speed of a relative movement between measurement object and sensor of the coordinate measuring machine. This speed can also be referred to as scanning speed if there is a so-called scanning capture of measurement points, i.e., a capture of measurement points while a relative movement is being carried out.

Further, the at least one parameter can be or represent a number of mutually different measurement trajectories for measuring the measurement object.

Further, the at least one parameter can be or represent a length of a measurement trajectory or the overall length of all measurement trajectories.

Further, the at least one parameter can be or represent a filter parameter for filtering the measurement values.

Further, the parameter can be or represent an evaluation parameter for evaluating the measurement values.

Further, the parameter can be or represent a parameter of a method for temperature compensation.

Preferably, the parameter is or represents the speed, in particular the maximum or average speed, of the relative movement between measurement object and sensor and/or the number of measurement points to be captured during a predetermined time interval during the measurement by the measurement strategy.

If one or more of the explained parameters are altered, there advantageously is a simple and, in terms of time, fast adaptation of the measurement strategy, which leads to a reduction in the measurement duration, the computational outlay and/or the required data storage capacity.

In a preferred embodiment, the number of measurement points to be captured by the sensor in a predetermined time interval is reduced if the measurement quality is greater than the target minimum measurement quality known in advance. Alternatively or cumulatively, the (maximum) movement speed of a relative movement between measurement object and sensor is increased if the measurement quality is greater than the target minimum measurement quality known in advance.

Advantageously, this yields a particularly simple reduction in the measurement time and/or the required data storage capacity and/or the required computational outlay.

In a preferred embodiment, at least one filter method for filtering the measurement values is altered for the purposes of altering the measurement strategy. By way of example, this can mean that low-pass filtering is implemented instead of bandpass filtering.

Further preferably, an evaluation method for evaluating the measurement values can be altered for the purposes of altering the measurement strategy, for example by changing a parameter of an evaluation method.

Further, a temperature compensation method for temperature compensation of the measurement values can be altered for the purposes of altering the measurement strategy.

Further, a test plan can be altered for the purposes of altering the measurement strategy. By way of example, test features, to be tested, of the measurement object to be measured or information items in relation to these test features can be contained in a test plan. Such test features can include, for example, the pitch of the centres of two bores, the deviation of measurement points on a free-form surface with respect to a target form, the location of the centre of a bore or the diameter of a bore. Likewise, the test plan can contain information items in respect of a relative position and shape of the measurement object to be tested, e.g., in a test coordinate system, and information items in relation to target values of test features. Information items relating to the shape can be contained in the test plan, for example in the form of a CAD model. Such a CAD model can also define the aforementioned target values. Further, the test plan can comprise tolerance specifications for a test feature. Further, the test plan can define work instructions for carrying out the test defined by the test plan, e.g., in the form of commands, the test parameters to be set for carrying this out and generating data, e.g., illumination parameters or probing forces, and the test components to be used for carrying this out, e.g. sensors. Additionally, the test plan can contain test parameters, which can be set or altered while the test is running, e.g., in order to adapt later (partial) test processes. Further, a test trajectory, e.g., of a sensor, to be traversed for carrying out the test can be set by the test plan. The test result documentation can also be defined by the test plan. Consequently, expressed in general, the test plan can contain rules which directly or indirectly describe a desired measurement procedure of the measurement.

The test plan can be altered by altering one or more of the aforementioned properties. However, change can also be brought about by adding or removing one or more properties. The test plan can be part of the measurement strategy. In particular, a parameter of the test plan can also be a parameter of the measurement strategy.

Further, altering a sensor type could be the change of the measurement strategy. By way of example, different sensor types could be different types of tactile sensors, different types of optical sensors or different types of further sensors for the measurement. Further, the measurement strategy can be altered by altering the measuring device type. By way of example, different types of measuring devices can be a column-type measuring device, a bridge-type measuring device, a robot-assisted measuring device, a screening measuring device or further measuring device types.

Further, the measurement strategy can be implemented by altering the measurement object clamping concept. By way of example, such a change can be implemented by virtue of altering an orientation of the measurement object relative to a reference coordinate system of the coordinate measuring machine. By way of example, such a change can consist of the measurement object being measured lying down rather than standing up. Such a change can also be implemented by virtue of the measuring object being arranged on a rotary table instead of a rigid base, or vice versa.

Further, the measurement strategy can be altered by virtue of altering an illumination concept for the measurement. By way of example, this can be implemented by changing the intensity of the illumination, light colour of the illumination and/or the number of utilized illumination sources.

Further, the measurement strategy can be altered by virtue of altering the type of relative movement between measurement object and coordinate measuring machine, in particular the measurement trajectory already mentioned above.

This advantageously yields great flexibility of the measurement strategy and a multiplicity of options for altering said measurement strategy in order to obtain the aforementioned reduction.

In a further embodiment, a sensor quality is additionally determined during the measurement. The sensor quality in this case represents the quality of generating measurement values by the sensor. Effects of the coordinate measuring machine and of the evaluation method on the quality of the measurement values generated remain unconsidered in this case. Rather, it is only effects of sensor properties on the quality of the measurement values that are taken into account when determining the sensor quality. By way of example, a sensor quality can be ascertained on the basis of a measurement variance or on the basis of a probe rigidity. Parameters of a distribution, for example the standard deviation, can be determined by means of a Shapiro-Wilk test, for example.

Further, at least one sensor parameter, in particular a probing parameter, of a sensor of the coordinate measuring machine is altered if the sensor quality is greater than a target minimum sensor quality known in advance, wherein the sensor parameter is altered in such a way that the time required to measure the measurement object in accordance with the measurement strategy that has been altered by altering the sensor parameter and/or the computational outlay required to measure the measurement object in accordance with the correspondingly altered measurement strategy and/or the required data storage capacity are/is reduced. Thus, a sensor parameter is altered here in order to alter the measurement strategy.

If the sensor quality determined during the measurement is not greater, or greater by less than a predetermined amount, than the target minimum sensor quality, it is not possible to carry out a change in the sensor parameter for the purposes of altering the measurement strategy if the measurement quality is greater than a predetermined target minimum measurement quality.

Expressed differently, the measurement strategy can be altered if the measurement quality is greater than a predetermined target minimum measurement quality, with the change however not being brought about by a change of a sensor parameter but by a change without effect on a sensor parameter if the sensor quality is not greater, or greater by less than a predetermined amount, than the target minimum sensor quality.

This advantageously yields an improved adaptation of the measurement strategy to the target minimum measurement quality by setting sensor parameters, with it being possible, however, to ensure that the target minimum sensor quality is guaranteed. By way of example, it is possible for sensor parameters to be altered in such a way that measurement points are omitted or not taken into account during the evaluation, as a result of which it is possible to reduce the time required for measuring the measurement object, the required computational outlay and the required data storage capacity. Alternatively or cumulatively, it is possible for sensor parameters to be altered in such a way that a correction of measurement points requires less time and/or less computational outlay.

Further proposed is an apparatus for determining a measurement strategy for measuring a measurement object using a coordinate measuring machine, wherein the apparatus comprises at least one evaluation device. The evaluation device can be or comprise a data processing device, which was already explained above. Further, the apparatus comprises the coordinate measuring machine which should be used to measure the measurement object or a further coordinate measuring machine that differs therefrom.

Further, the measurement object is measurable by means of the coordinate measuring machine or a further coordinate measuring machine in accordance with a predetermined measurement strategy.

Further, at least one measurement quality is determinable by means of the evaluation device. In particular, the measurement quality can be determinable by way of a measuring system analysis in this case. Methods for measuring system analysis are known here to a person skilled in the art, with some exemplary methods already having been explained above.

According to the invention, the measurement strategy is able to be altered if the measurement quality is greater than a target minimum measurement quality known in advance. In particular, the measurement strategy is altered if the measurement quality is greater, in particular greater by more than a predetermined amount, than the target minimum measurement quality known in advance. Here, the change can be carried out in fully automated fashion, for example by the data processing device. The latter can identify suitable changes and then carry these out. The change can also be carried out in partly automated fashion. In this case, suitable changes can be identified and proposed to, or offered for selection by, a user. The latter can then carry out one or more change(s) by way of a confirmation, for example by input by means of an input device of the apparatus. However, it is also possible for the user to define and carry out the change, for example by way of an input.

Thus, the apparatus is in this case configured in such a way that a method according to one of the embodiments described in this disclosure is able to be carried out by the apparatus. Consequently, an apparatus which is able to carry out a corresponding method and consequently realizes the technical advantages already explained above arises in advantageous fashion.

Further proposed is a program which, when executed on or by a computer, prompts the computer to carry out one, a plurality or all of the steps of a method according to any one of the embodiments described in this disclosure for determining a measurement strategy for measuring a measurement object using a coordinate measuring machine.

By way of example, the program can prompt the computer to drive a coordinate measuring machine to measure the measurement object in accordance with a measurement strategy. Further, the program can prompt the computer to determine the measurement quality. Further, the program can prompt the computer to carry out the change in fully or partly automated fashion. This has already been described above.

Alternatively or cumulatively, a program storage medium or computer program product, on or in which the program is stored, in particular in a non-temporary, e.g. permanent, form, is described. Alternatively or cumulatively, a computer that comprises this program storage medium is described. Further alternatively or cumulatively, a signal is described, for example a digital signal, which encodes information items representing the program and which comprises coding means adapted to carry out one, a plurality or all of the steps of the method set out in this disclosure for determining a measurement strategy for measuring a measurement object using a coordinate measuring machine. The signal can be a physical signal, e.g. an electrical signal, which in particular is generated technically or by machine. The program can also prompt the computer to carry out methods.

Further, the program can also prompt the computer to carry out a test of the measurement object in accordance with the altered measurement strategy, in particular by driving a coordinate measuring machine to measure the measurement object in accordance with the altered measurement strategy.

Further, the method for determining a measurement strategy can be a computer-implemented method. For example, one, a plurality or all of the steps of the method can be carried out by a computer. One embodiment of the computer-implemented method is the use of the computer for carrying out a data processing method. In this case, the computer can comprise, for example, at least one of the above-described data processing devices or can be embodied as such. It can comprise a processor, and possibly a storage device, in order to process the data, in particular technically, for example electronically and/or optically. A computer can in this case be any kind of data processing device. A processor can be a semiconductor-based processor.

Further, a method is described for measuring a measurement object using the coordinate measuring machine. Here, the method for determining a measurement strategy for measuring the measurement object, as explained above, is carried out, with the measurement of the measurement object then being carried out in accordance with the measurement strategy that has been altered as proposed.

Here, the measurement of the measurement object for determining the measurement quality can be carried out by the coordinate measuring machine which is different from the coordinate measuring machine that carries out the measurement of the measurement object using the measurement strategy that has been altered as proposed. However, the same coordinate measuring machine is preferably used both for measuring the measurement object for the purposes of determining the measurement quality and for the measurement using the measurement strategy that has been altered as proposed.

Further, a coordinate measuring machine comprising an apparatus for determining a measurement strategy for measuring the measurement object using the coordinate measuring machine in accordance with one of the embodiments described in this disclosure is described. Then, the measurement object can be measured using the altered measurement strategy by way of the coordinate measuring machine.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
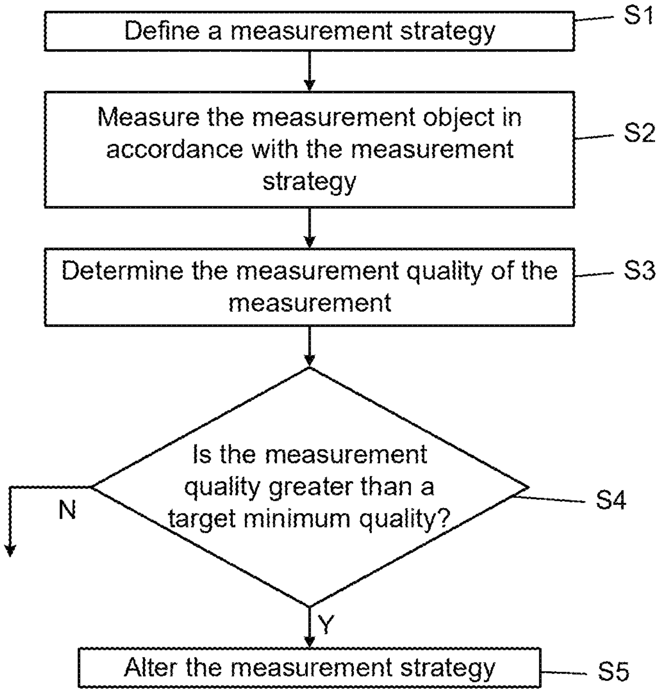
FIG. 1 is a schematic flowchart of a method according to the invention.
Figure 4:
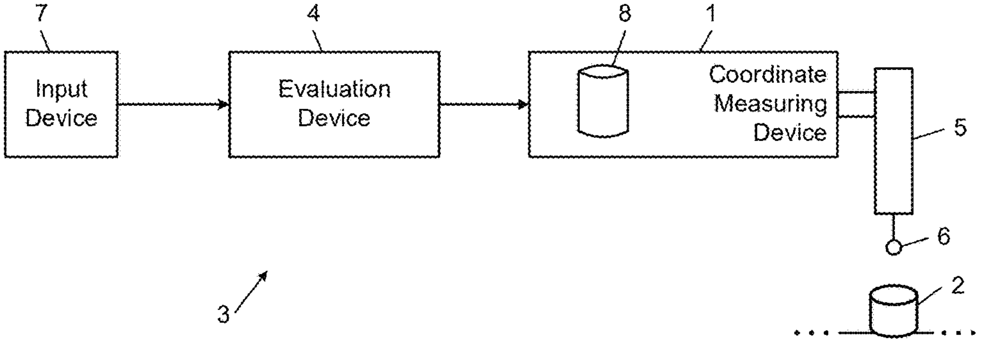
FIG. 4 is a schematic block diagram of an apparatus according to the invention.

FIG. 1 shows a schematic flowchart of a method according to the invention for determining a measurement strategy for measuring a measurement object 2 using a coordinate measuring machine 1 (see FIG. 4). A measurement strategy is defined, for example by a user or in (partly) automated fashion, in a first step S1. This measurement strategy can also be referred to as initial measurement strategy. Alternatively, an altered measurement strategy can also be used if the method has been carried out previously.

In a second step S2, the measurement object 2 is measured in accordance with the initial measurement strategy, for example by the coordinate measuring machine 1 illustrated in FIG. 4.

The measurement quality of the measurement carried out in the second step S2 is determined in a third step S3. This measurement quality depends on the measurement quality-relevant parameters of the measurement strategy, which were already explained above. However, the measurement strategy additionally also depends on ambient conditions, such as, e.g., the temperature, an incidence of light, a degree of dirtying. Further, the measurement quality depends on the quality of the shape of the workpiece. The latter can change dynamically, e.g., reduce, if the manufacturing of the workpiece becomes less accurate, for example on account of wear of tools for production.

A check is carried out in a fourth step S4 as to whether the measurement quality determined in the third step S3 is greater than a predetermined target minimum measurement quality, in particular greater by more than a predetermined amount, e.g., by more than 5%. If the measurement quality is less than the target minimum measurement quality, measures for improving the measurement quality, which are not described in any more detail in this disclosure, are carried out. If the measurement quality is equal to or greater than the target minimum measurement quality, but not greater by more than a predetermined amount, the method can be terminated without altering the current measurement strategy.

If the measurement quality is greater than the predetermined target minimum measurement quality, in particular by more than the predetermined amount, the measurement strategy is altered in a fifth step S5 and determined as new measurement strategy, i.e., as measurement strategy to be applied in future. In this case, the change in the fifth step S5 is implemented in such a way that the time required to measure the measurement object 2 in accordance with the altered measurement strategy and/or the computational outlay required to measure the measurement object 2 and/or the data storage capacity required to measure the measurement object 2 are/is reduced. Hereinafter, in an illustrated sixth step, the measurement object 2 can be measured in accordance with the altered measurement strategy, for example by the coordinate measuring machine 1 illustrated in FIG. 4.

It is possible for the method to be carried out repeatedly, in particular until the measurement quality determined in the fourth step S4 equals or is greater than the target minimum measurement quality, but not greater by more than a predetermined amount.

To this end, the measurement strategy altered in the fifth step S5 can be used in the second step S2 for the measurement when the method is carried out again, in order to determine the measurement quality of the measurement again and, where necessary, to determine a further altered measurement strategy. Consequently, the method can return to the second step S2 after the fifth step S5, in particular if the measurement quality continues to be greater than the predetermined target minimum measurement quality or greater than the predetermined target minimum measurement quality by more than a predetermined amount.

Figure 2:
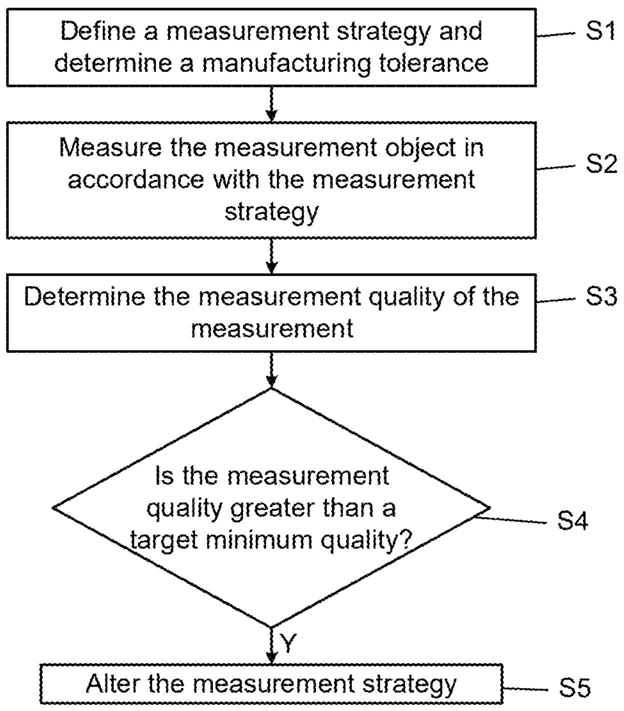
FIG. 2 is a schematic flowchart of a method according to the invention in a further embodiment.

FIG. 2 shows a schematic flowchart of a method according to the invention in a further embodiment. This embodiment is substantially the same as the embodiment of the method illustrated in FIG. 1.

However, a manufacturing tolerance of the measurement object, for example a tolerance of at least one test feature, is additionally determined in the first step S1. The latter can be determined in model-based fashion, for example on the basis of a CAD model. Then, in accordance with the embodiment illustrated in FIG. 1, a measurement object 2 (see FIG. 4) is measured on the basis of the measurement strategy in a second step S2 and the measurement uncertainty is determined in a third step S3, with the measurement quality then being determined as a relationship between this measurement uncertainty and the manufacturing tolerance known in advance.

According to this, the fourth step S4 is carried out in accordance with the embodiment illustrated in FIG. 1, wherein the target minimum measurement quality is, e.g., 1/10 and the fifth step S5 is carried out if the relationship ascertained in the third step S3 is more than 5% less than 1/10.

Then, the number of measurement points to be captured by the sensor of the coordinate measuring machine 1 (see FIG. 4) in a predetermined time interval is reduced in the fifth step S5. Alternatively or cumulatively, the movement speed, in particular a maximum speed or an average speed, of the relative movement between measurement object 2 and sensor 3 is increased.

Figure 3:
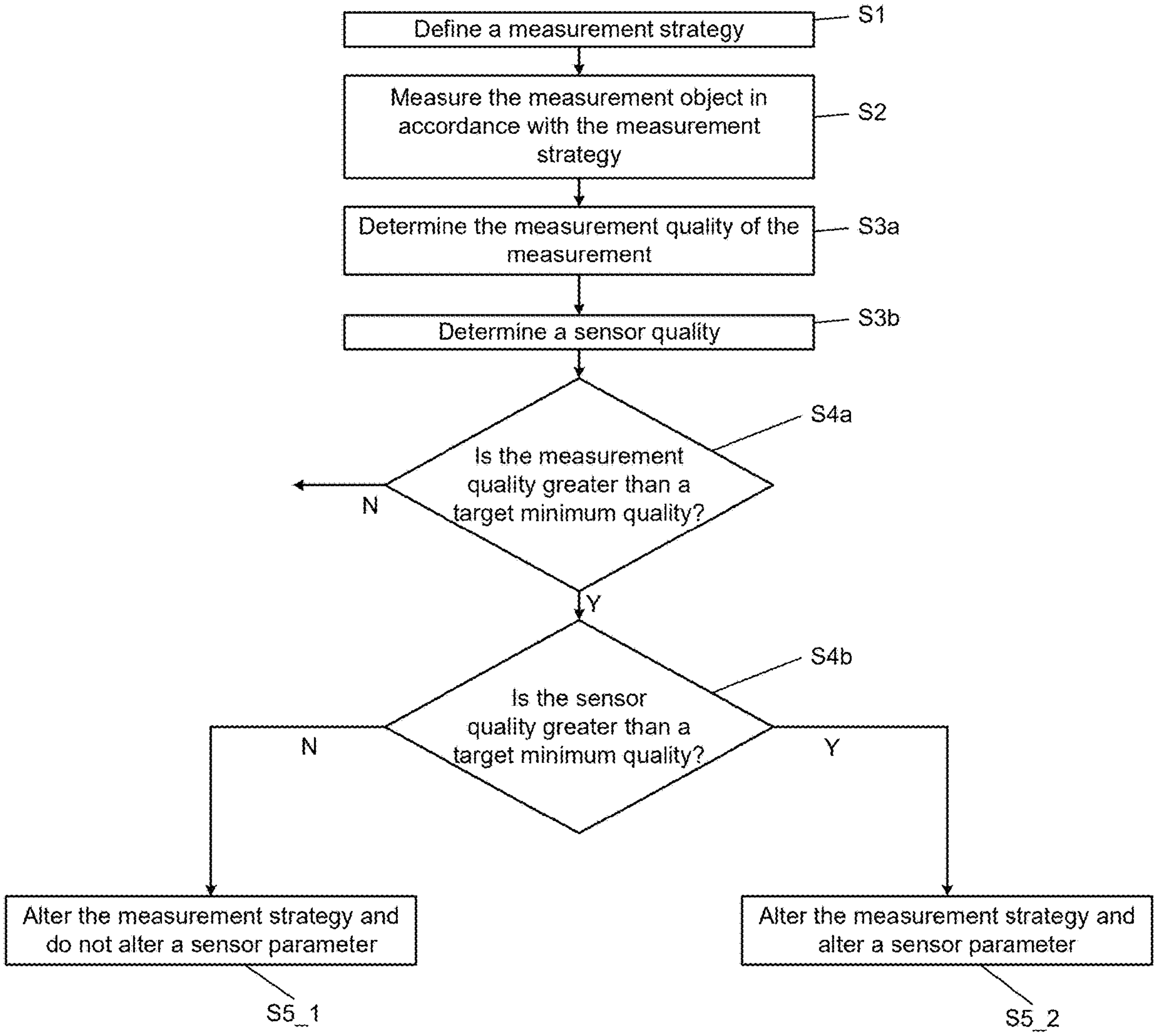
FIG. 3 is a schematic flowchart of a method according to the invention in a further embodiment.

FIG. 3 shows a schematic flowchart of a method according to the invention in a further embodiment. In contrast to the embodiment illustrated in FIG. 1, the measurement quality is determined in a first partial step S3*a* of the third step S3, with a sensor quality being determined in a second partial step S3*b*. In a first partial step S4*a* of the fourth step S4, the measurement quality ascertained in the first partial step S3*a* of the third step S3 is then evaluated, in accordance with the fourth step S4 in the exemplary embodiment illustrated in FIG. 1.

However, if the measurement quality is greater than the target minimum measurement quality known in advance, there is in a second partial step S4*b* of the fourth step S4 a comparison of the sensor quality ascertained in the second partial step S3*b* of the third step S3 with the target minimum sensor quality known in advance.

If the ascertained sensor quality is not greater than the corresponding target value, it is possible to carry out measures, not described in detail, for improving the measurement quality and/or the sensor quality.

However, if said quality equals the target minimum sensor quality known in advance or if it is located in an admissible range, the measurement strategy is altered in a first alternative step S5_1 and the altered measurement strategy is determined as new measurement strategy, with, however, no sensor parameter of the sensor, i.e., no sensor quality-relevant parameter, being altered by the change.

If the sensor quality is greater than the target minimum sensor quality known in advance, the measurement strategy is altered in a second alternative step S5_2 by altering a sensor parameter in such a way that the time and/or the computational outlay and/or the data storage capacity required to measure the measurement object in accordance with the measurement strategy are/is reduced.

Here, the alternative steps S5_1, S5_2 denote steps that are carried out as alternatives to one another when the fifth step S5 is carried out.

If the measurement quality determined in the first partial step S4*a* of the fourth step S4 equals the target minimum measurement quality or if it is located in a predetermined admissible range (and consequently there is no change in the measurement strategy), there naturally can also be a check as to whether the sensor quality equals the target minimum sensor quality or is located in a predetermined admissible range. If this is not the case, measures for improving the sensor quality, which are not explained in more detail, can be carried out.

FIG. 4 shows a schematic block diagram of an apparatus 3 according to the invention for determining a measurement strategy for measuring a measurement object 2 using a coordinate measuring machine 1. It comprises an evaluation device 4 embodied as a computing device, which, for example, can comprise a microcontroller or an integrated circuit or be embodied as such. Further, the apparatus 3 comprises the coordinate measuring machine 1. Then, the measurement object 2 is able to be measured by means of the coordinate measuring machine 1, which is represented in this example as a tactile coordinate measuring machine 1 with a stylus 5 and a probe ball 6, in accordance with an initial measurement strategy, which may have been specified, for example, by a user by means of an appropriate input device 7. Here, the coordinate measuring machine 1 produces measurement values during the measurement of the measurement object 2 in accordance with the initial measurement strategy, which measurement values can then be evaluated by the evaluation device 4. In this case, the evaluation device 4 can apply an appropriate evaluation method. The evaluation device 4 can also apply an appropriate filter method for filtering the measurement values.

Further, the measurement quality of the utilized measurement strategy can be determined by the evaluation device 4. Further, the evaluation device 4 can alter the measurement strategy if the measurement quality is greater than a predetermined target minimum measurement quality, wherein the change is implemented in such a way that the time and/or computational outlay and/or data storage capacity required to measure the measurement object 2 are/is reduced, with the altered measurement strategy then being determined as new measurement strategy for measuring the measurement object 2 and further measurement objects, in particular the same or similar measurement objects. This measurement strategy can then be stored, for example in a storage device 8 of the evaluation device 4 or an external storage device (not illustrated) data-connected to the evaluation device 4.

In this case, the evaluation device 4 can also serve as a control device for controlling the coordinate measuring machine 1 for the purposes of measuring the measurement object 2.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

LIST OF REFERENCE SIGNS

1 Coordinate measuring machine
2 Measurement object
3 Apparatus
4 Evaluation device
5 Stylus
6 Probe ball
7 Input device
8 Storage device
S1 First step
S2 Second step
S3 Third step
S3*a*, S3*b* Partial steps of the third step

S4 Fourth step
S4*a*, S4*b* Partial steps of the fourth step
S5 Fifth step
S5_1 First alternative step
S5_2 Second alternative step

What is claimed is:

1. A method for determining an altered measurement strategy for measurement of a measurement object using a coordinate measuring machine, the method comprising:

measuring the measurement object via the coordinate measuring machine according to an initial measurement strategy to generate an initial measurement, wherein measuring the measurement object includes capturing, using at least a sensor of the coordinate measuring machine, a number of measurement points of the measurement object;

determining (i) a measurement quality of the initial measurement and (ii) a sensor quality during or after the capturing of the measurement points using the sensor in the initial measurement;

subsequent to generating the initial measurement, in response to the measurement quality being greater than a target minimum measurement quality, altering the initial measurement strategy to produce the altered measurement strategy, wherein the altering the initial measurement strategy is performed such that at least one of:

time required to measure the measurement object in accordance with the altered measurement strategy is reduced, computational outlay required to measure the measurement object in accordance with the altered measurement strategy is reduced, and data storage capacity required to measure the measurement object in accordance with the altered measurement strategy is reduced;

in response to the sensor quality being greater than a target minimum sensor quality, altering at least one sensor parameter of the sensor, wherein:

the at least one sensor parameter is an adjustable parameter of the sensor that impacts the sensor quality, and the altering the at least one sensor parameter is performed to reduce at least one of:

the time required to measure the measurement object in accordance with the altered measurement strategy, the computational outlay required to measure the measurement object in accordance with the altered measurement strategy, and the data storage capacity required to measure the measurement object in accordance with the altered measurement strategy; and controlling the coordinate measuring machine to measure at least one of the measurement object and a second measurement object according to the altered measurement strategy by probing, via the sensor, the at least one of the measurement object and the second measurement object based on the altered at least one sensor parameter.

2. The method of claim 1 wherein the altered measurement strategy results in a reduction of at least one property of the initial measurement strategy.

3. The method of claim 2 wherein the at least one property of the initial measurement strategy is the measurement quality.

4. The method of claim 1 wherein the measurement quality is determined by virtue of determining at least one measurement quality parameter that represents the measurement quality.

5. The method of claim 4 wherein the at least one measurement quality parameter is a relationship between measurement uncertainty and a manufacturing tolerance.

6. The method of claim 5 wherein a variable that represents at least one of accuracy, repeatability, reproducibility, linearity, and stability of the initial measurement is determined as the measurement quality.

7. The method of claim 1 wherein a variable that represents at least one of accuracy, repeatability, reproducibility, linearity, and stability of the initial measurement is determined as the measurement quality.

8. The method of claim 1 further comprising determining a variable representing the measurement quality by performing at least one of a gauge repeatability and reproducibility test or a test pursuant to German Association of the Automotive Industry Volume 5.

9. The method of claim 1 wherein the altering the initial measurement strategy includes altering at least one measurement-quality-relevant parameter of the initial measurement strategy.

10. The method of claim 9 wherein the at least one measurement-quality-relevant parameter is or represents at least one of:

a filter parameter for filtering measurement values, an evaluation parameter for evaluating the measurement values, and a parameter for temperature compensation.

11. The method of claim 1 further comprising, in response to the measurement quality being greater than the target minimum measurement quality, at least one of:

reducing the number of measurement points to be captured by the sensor within a predetermined time interval;

increasing a speed of relative movement between the measurement object and the sensor; and reducing a spatial distribution of the measurement points to be captured.

12. The method of claim 1 wherein altering the initial measurement strategy includes altering at least one of:

a filter method for filtering measurement values, an evaluation method for evaluating the measurement values, a temperature compensation method for temperature compensation, a test plan, a sensor type, a measuring device type, a measurement object clamping concept, an illumination concept, and a type of relative movement between the measurement object and the sensor of the coordinate measuring machine.

13. The method of claim 1 wherein the sensor quality represents a quality of generating measurement values by the sensor independent of effects of the coordinate measuring machine.

14. The method of claim 13 wherein the effects of the coordinate measuring machine include a speed of relative movement between the measurement object and the sensor.

15. The method of claim 13 wherein:

the at least one sensor parameter includes a probing parameter; and the probing parameter includes at least one of a probing force and a probing orientation.

16. The method of claim 13 wherein the at least one sensor parameter is altered such that at least one measurement point of the sensor is omitted or not considered to reduce the time required to measure the measurement object.

17. The method of claim 1 wherein:

the altering the initial measurement strategy includes altering at least one measurement-quality-relevant parameter of the initial measurement strategy, and the at least one measurement-quality-relevant parameter includes at least one of:

a number of measurement trajectories, a length of a measurement trajectory, a filter parameter for filtering measurement values, an evaluation parameter for evaluating the measurement values, and a parameter for temperature compensation.

18. The method of claim 1 wherein the altered measurement strategy corresponds to a reduced measurement quality in comparison with the initial measurement strategy.

19. The method of claim 18 wherein the reduced measurement quality includes a reduction in at least one of accuracy, repeatability, reproducibility, linearity, and stability.

20. The method of claim 1 wherein the sensor quality is determined by considering effects of sensor properties of the sensor on a quality of generating measurement values by the sensor.

21. The method of claim 1 wherein:

the initial measurement strategy is repeatedly altered until the measurement quality is less than a level that is a predetermined amount above the target minimum measurement quality, and repeatedly altering the initial measurement strategy includes:

generating additional altered measurement strategies, and capturing, by the sensor, additional measurement points of the measurement object according to the additional altered measurement strategies.

22. The method of claim 21 wherein the altered measurement strategy is altered to generate a second altered measurement strategy while the sensor is capturing measuring points of the measurement object according to the altered measurement strategy.

23. The method of claim 21 wherein the initial measurement strategy is repeatedly altered until a maximum reduction is achieved in at least one of the time required to measure the measurement object and the computational outlay required to measure the measurement object.

24. The method of claim 21 wherein the threshold predetermined amount is zero.

25. The method of claim 1 wherein:

in response to satisfaction of all of a set of criteria, the initial measurement strategy is altered without the at least one sensor parameter being altered; and the set of criteria includes (i) the measurement quality being greater than the target minimum measurement quality and (ii) the sensor quality being less than a level that is a predetermined amount above the target minimum sensor quality.

26. An apparatus for determining an altered measurement strategy for measurement of a measurement object, the apparatus comprising:

a coordinate measuring machine including a sensor and configured to measure the measurement object in accordance with an initial measurement strategy to generate an initial measurement by using at least the sensor to capture a number of measurement points of the measurement object; and an evaluation device configured to determine (i) a measurement quality of the initial measurement and (ii) a sensor quality during or after the capturing of the measurement points using the sensor in the initial measurement, wherein:

in response to the measurement quality being greater than a target minimum measurement quality, the initial measurement strategy is altered by the evaluation device to produce the altered measurement strategy, the initial measurement strategy is altered to reduce at least one of:

time required to measure the measurement object in accordance with the altered measurement strategy, computational outlay required to measure the measurement object in accordance with the altered measurement strategy, and data storage capacity required to measure the measurement object in accordance with the altered measurement strategy, in response to the sensor quality being greater than a target minimum sensor quality, at least one sensor parameter of the sensor is altered by the evaluation device to reduce at least one of:

the time required to measure the measurement object in accordance with the altered measurement strategy, the computational outlay required to measure the measurement object in accordance with the altered measurement strategy, and the data storage capacity required to measure the measurement object in accordance with the altered measurement strategy, the at least one sensor parameter is an adjustable parameter of the sensor that impacts the sensor quality, and the coordinate measuring machine is configured to measure at least one of the measurement object and a second measurement object according to the altered measurement strategy by probing, via the sensor, the at least one of the measurement object and the second measurement object based on the altered at least one sensor parameter.

27. The apparatus of claim 26 wherein:

the altered measurement strategy results in a reduction of at least one property of the initial measurement strategy.

28. A non-transitory computer-readable medium comprising instructions including:

using a coordinate measuring machine, generating an initial measurement by measuring a measurement object according to an initial measurement strategy, wherein measuring the measurement object includes capturing, using at least a sensor of the coordinate measuring machine, a number of measurement points of the measurement object;

determining (i) a measurement quality of the initial measurement and (ii) a sensor quality during or after the capturing of the measurement points using the sensor in the initial measurement;

subsequent to generating the initial measurement, altering the initial measurement strategy in response to the measurement quality being greater than a target minimum measurement quality to produce an altered measurement strategy, wherein the altering the initial measurement strategy is performed such that at least one of:
- time required to measure the measurement object in accordance with the altered measurement strategy is reduced,
- computational outlay required to measure the measurement object in accordance with the altered measurement strategy is reduced, and
- data storage capacity required to measure the measurement object in accordance with the altered measurement strategy is reduced;

in response to the sensor quality being greater than a target minimum sensor quality, altering at least one sensor parameter of the sensor, wherein:
- the at least one sensor parameter is an adjustable parameter of the sensor that impacts the sensor quality, and
- the altering the at least one sensor parameter is performed to reduce at least one of:
  - the time required to measure the measurement object in accordance with the altered measurement strategy,
  - the computational outlay required to measure the measurement object in accordance with the altered measurement strategy, and
  - the data storage capacity required to measure the measurement object in accordance with the altered measurement strategy; and controlling the coordinate measuring machine to measure at least one of the measurement object and a second measurement object according to the altered measurement strategy by probing, via the sensor, the at least one of the measurement object and the second measurement object based on the altered at least one sensor parameter.

29. The non-transitory computer-readable medium of claim 28 wherein:

the altered measurement strategy results in a reduction of at least one property of the initial measurement strategy.

* * * * *